US007124009B2

(12) United States Patent
Kustosch et al.

(10) Patent No.: US 7,124,009 B2
(45) Date of Patent: Oct. 17, 2006

(54) METHOD AND ARRANGEMENT FOR MONITORING A DECELERATION FUNCTION OF A CONTROL UNIT OF A MOTOR VEHICLE

(75) Inventors: Mario Kustosch, Vaihingen/Enz (DE); Gerit von Schwertfuehrer, Ludwigsburg (DE); Michael Glora, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 459 days.

(21) Appl. No.: 10/685,804

(22) Filed: Oct. 16, 2003

(65) Prior Publication Data

US 2004/0254709 A1 Dec. 16, 2004

(30) Foreign Application Priority Data

Oct. 16, 2002 (DE) ............................... 102 48 195

(51) Int. Cl.
*G06F 19/00* (2006.01)

(52) U.S. Cl. ........................... 701/70; 701/96; 180/179

(58) Field of Classification Search .................. 701/70, 701/71, 82, 93, 96; 180/170, 176, 179; 123/351, 123/352

See application file for complete search history.

(56) References Cited

U.S. PATENT DOCUMENTS

| | | | | |
|---|---|---|---|---|
| 5,647,647 | A * | 7/1997 | Kato et al. | 303/122.09 |
| 6,427,111 | B1 * | 7/2002 | Dieckmann | 701/96 |
| 6,554,089 | B1 | 4/2003 | Sato et al. | |
| 6,591,180 | B1 | 7/2003 | Steiner | |
| 6,732,039 | B1 | 5/2004 | Ino et al. | |
| 6,922,624 | B1 * | 7/2005 | Isaji et al. | 701/70 |

FOREIGN PATENT DOCUMENTS

| | | |
|---|---|---|
| DE | 100 52 816 | 5/2002 |

* cited by examiner

*Primary Examiner*—Gary Chin
(74) *Attorney, Agent, or Firm*—Walter Ottesen

(57) ABSTRACT

A method and an arrangement for monitoring a deceleration function of a control unit of a motor vehicle affect as little as possible the operability of the control unit in the case of a fault. The deceleration function of a control unit (1) of a motor vehicle inputs a vehicle deceleration independently of the actuation of a vehicle brake operator-controlled element. The input is transmitted via a deceleration interface (5) to a brake system (10) of the vehicle to realize the input. A check is made as to whether a brake intervention of the brake system (10), which is initiated by the deceleration function, is permissible and, at first, only the deceleration function is deactivated when the brake intervention is impermissible.

10 Claims, 2 Drawing Sheets

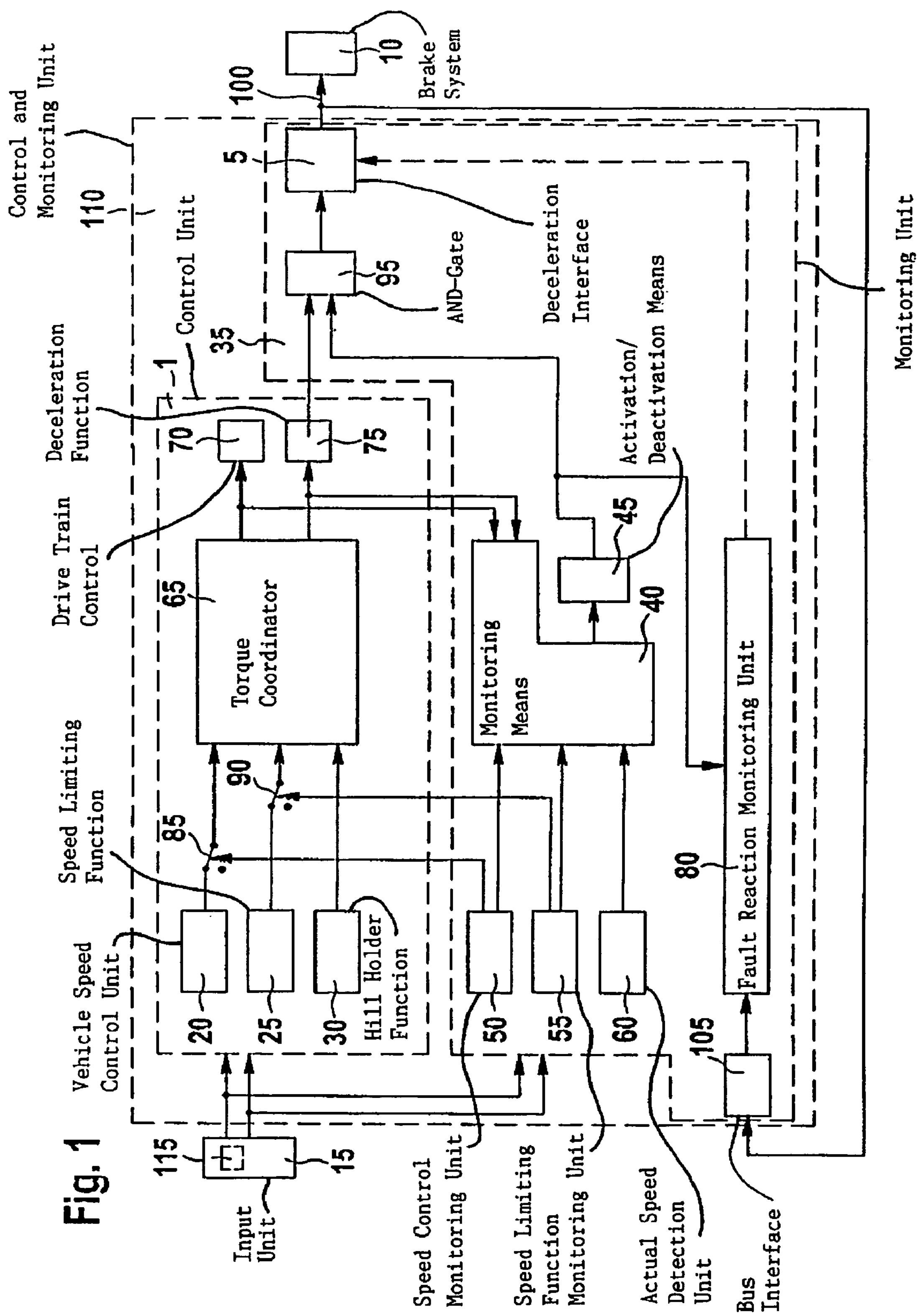
Fig. 1
Control and Monitoring Unit
110
Control Unit
35
1
Deceleration Function
Drive Train Control
Speed Limiting Function
Vehicle Speed Control Unit
Hill Holder Function
Torque Coordinator
65
70
75
85
90
20
25
30
Monitoring Means
40
45
Activation/ Deactivation Means
50
55
60
Speed Control Monitoring Unit
Speed Limiting Function Monitoring Unit
Actual Speed Detection Unit
95
AND-Gate
5
Deceleration Interface
100
10
Brake System
Monitoring Unit
80
Fault Reaction Monitoring Unit
105
Bus Interface
115
15
Input Unit START
Actual Vehicle Speed <
Pregiven Value?
200
yes
no
Input of User Plausible?
205
no
yes
Is Engine Drag
Torque Requested
by Torque
Coordinator?
210
no
yes
Input of Vehicle
Deceleration within
Pregiven Range?
215
no
yes
220
225
Detects Brake
Intervention
as Permissible
Detects Brake
Intervention
as Impermissible
END

METHOD AND ARRANGEMENT FOR MONITORING A DECELERATION FUNCTION OF A CONTROL UNIT OF A MOTOR VEHICLE

CROSS REFERENCE TO RELATED APPLICATION

This application claims priority of German patent application no. 102 48 195.4, filed Oct. 16, 2002, the entire content of which is incorporated herein by reference.

BACKGROUND OF THE INVENTION

Motor vehicles are known which include a brake system, for example, an ESP system (electronic stabilization program), which includes a deceleration interface and thereby enables the system to initiate a vehicle deceleration via a bus system connecting control apparatuses. At the present time, the possibility is utilized by a control apparatus for adaptive vehicle speed control to request a vehicle deceleration from the braking system via the bus system connecting the control apparatuses by means of the deceleration interface.

The monitoring concept of the control apparatus for the adaptive vehicle speed control provides for a switchoff of its interface to the bus system connecting the control apparatuses and therewith also a switchoff of the deceleration interface in order to avoid an implausible response of the deceleration interface as a fault reaction.

In contrast to the motor control, the switchoff of the communication via the bus system connecting the control apparatuses means, in the case of the control apparatus for the adaptive vehicle speed control, only the possibly temporary unavailability of a comfort system. If, however, in the motor control, the interface for the system connecting the control apparatuses is switched off, then this can have considerably greater consequences.

SUMMARY OF THE INVENTION

The method of the invention and the arrangement of the invention for monitoring a deceleration function of a control unit of a motor vehicle afford the advantage that, for a deceleration function for inputting a vehicle deceleration independently of the actuation of a vehicle brake operator-controlled element, a check is made as to whether a brake intervention of the brake system, which is initiated by the deceleration function, is permissible and that first only the deceleration function is deactivated when the brake intervention is impermissible. The input is transmitted via a deceleration interface to a brake system of the vehicle to realize the input. In this way, an implausible response of the deceleration interface and therefore an implausible activation of the deceleration function is reliably prevented without having to deactivate additional functions of the control unit, the control unit itself or its complete interface to the bus system connecting the control apparatuses. With the exception of the deceleration function, the control unit remains fully operational.

Furthermore, such a monitoring of the deceleration function can be integrated modularly into an existing monitoring concept of the control unit without affecting the existing monitoring concept.

It is especially advantageous when a brake intervention, which is initiated by the deceleration function, is recognized as permissible when it is plausible to a driver command pregiven at least an operator-controlled element of the vehicle different from a vehicle brake operator-controlled element. In this way, a brake intervention, which is incompatible with the driver command, and therefore an activation of the deceleration function is prevented which is unexpected for the driver and which, under certain circumstances, can endanger the driving safety, for example, in a passing operation.

A further advantage is that a brake intervention, which is initiated by the deceleration function, is recognized as being permissible when a motor drag torque is requested. In this way, it can easily be recognized that a deceleration command is present which can be supported by a brake intervention initiated by the deceleration function.

A further advantage is that a brake intervention, which is initiated by the deceleration function, is recognized as permissible when the input of the vehicle deceleration lies within a pregiven range. In this way, for example, only brake interventions, which are pleasant for the driver, are realized by the deceleration function in the context of a comfort function; whereas, full braking operations or emergency braking operations are reserved for safety functions which, for example, react to a corresponding actuation of a vehicle brake operator-controlled element as, for example, in an anti-blocking system.

A further advantage is that a brake intervention, which is initiated by the deceleration function, is recognized as permissible when an instantaneous vehicle speed drops below a pregiven value. In this way, the operation of specific deceleration functions or brake functions is ensured for a low speed or a vehicle at standstill, for example, such as a hill holder function. At correspondingly low vehicle speeds and therefore at a correspondingly low selection of the pregiven value for the instantaneous vehicle speed, a defectively initiated brake intervention remains without significant effect on the driving safety and the driving comfort as well as without significant wear of the brake system.

A further advantage is that a drive unit of the vehicle is controlled by the control unit, preferably, a motor control. In this way, the functionality of the conventional motor controls can be expanded by an additional deceleration function and its modular monitoring.

A further advantage is that, with the control unit, a vehicle speed control and/or a preferably variable speed limiting function and/or a hill holder function is realized. In this way, such a vehicle speed control and/or speed limiting function and/or hill holder function can be more flexible utilized with the brake function and therefore in an expanded functionality. If the above-mentioned functions require a reduction of the vehicle speed, then this can be realized more rapidly with the aid of the brake intervention.

BRIEF DESCRIPTION OF THE DRAWINGS

The invention will now be described with reference to the drawings wherein:

FIG. 1 is a block circuit diagram of an arrangement of the invention; and,

DESCRIPTION OF THE PREFERRED EMBODIMENTS OF THE INVENTION

Figure 2:
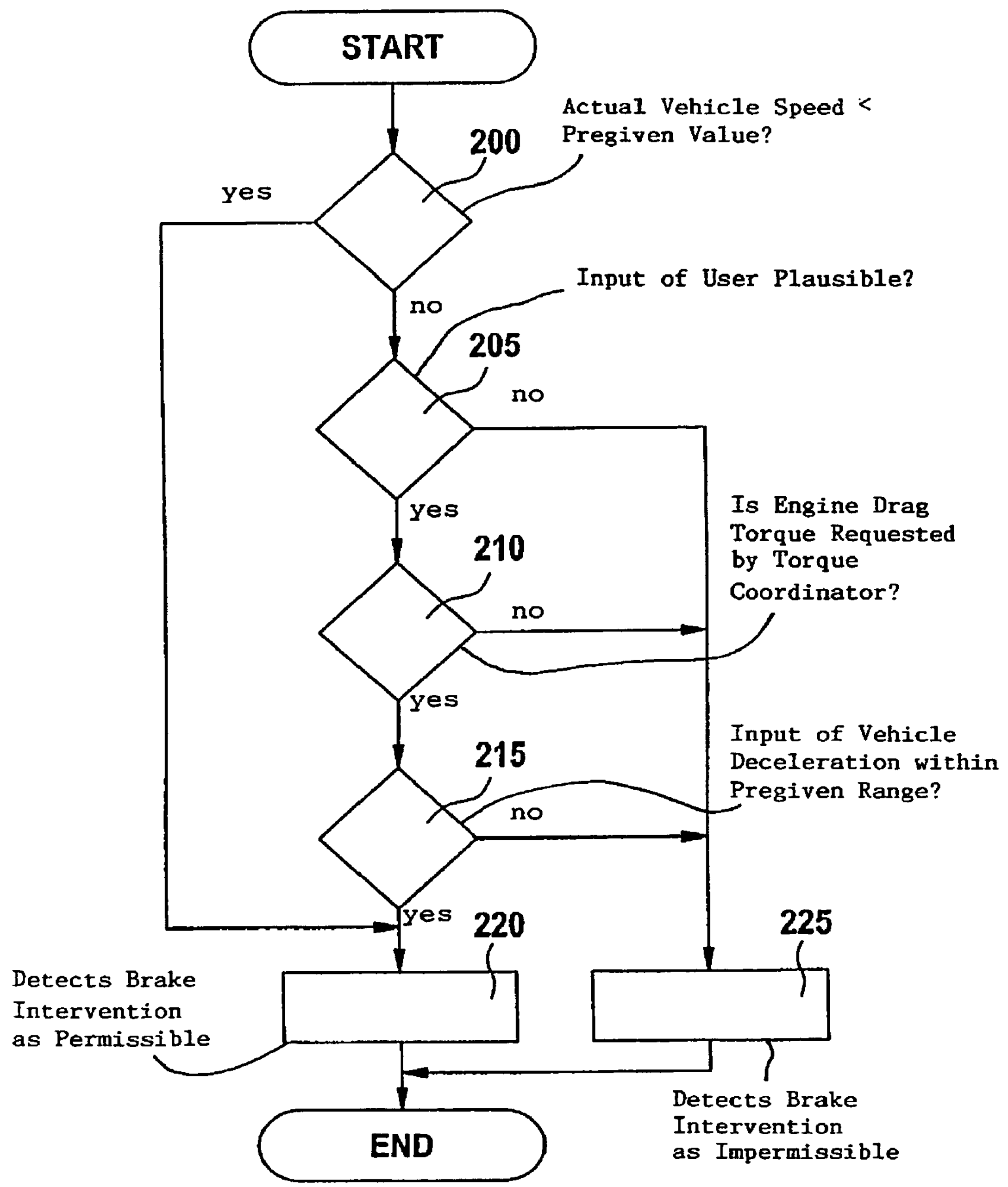
FIG. 2 is a flowchart showing the method of the invention.

In FIG. 1, reference numeral 110 identifies a control and monitoring unit of a motor vehicle which includes a control unit 1 and an arrangement 35 configured in accordance with the invention as a monitoring unit. The control unit 1 can, for example, be an engine control. The control unit 1 can, however, also be any desired other control apparatus of the motor vehicle, for example, the control unit also can be a control apparatus for an adaptive vehicle speed control. In the following, it is assumed by way of example that the control unit 1 defines the engine control of a motor vehicle. The engine control 1 and the monitoring unit 35 can be realized by various computers. The engine control 1 and the monitoring unit 35 can, alternatively, be configured as different levels of one and the same computer.

In this example, the engine control 1 includes a vehicle speed control unit 20, a speed limiting function 25 and a so-called hill holder function 30. The hill holder function 30 is a function which prevents the forward and backward rolling of the vehicle on a hill for a defined time after the driver pulls back on the vehicle braking operator-controlled element, for example, a brake pedal. In this way, a start-drive support is ensured. The holding of the vehicle is achieved via a storage of the brake pressure which was sufficient to bring the vehicle to standstill on the hill. After the elapse of a defined time span or after the driver requests sufficient engine torque via an accelerator pedal in order to be able to reliably accelerate, the storage of the brake pressure is ended and a start-drive on the hill is made possible. The speed limiting function 25 makes possible a limiting of the vehicle speed to a pregiven highest value which, for example, can be pregiven variably by the driver at an input unit 15.

The vehicle speed control 20 causes the instantaneous actual speed of the vehicle to track a desired speed likewise pregiven by the driver at the input unit 15 or, in the case of an adaptive vehicle speed control, causes the instantaneous actual speed to track a desired value pregiven in dependence upon the traffic which is ahead.

The input unit 15 can include several operator-controlled elements in order to input the desired speed for the vehicle speed control 20, an upper speed limit for the speed limiting function 25 and an engine torque for the hill holder function 30. The speed values for the vehicle speed control 20 and the speed limiting function 25 can, for example, be inputted with the aid of a multi-function vehicle-speed control lever or several operator-controlled levers; whereas, the engine torque for the hill holder function 30 can be pregiven by actuating the accelerator pedal. The input unit 15 includes the multi-function vehicle-speed control lever or the operator-controlled levers and the accelerator pedal. Furthermore, the input unit 15 can include one or several vehicle braking operator-controlled elements such as a brake pedal or a hand brake. The actuation of the vehicle brake operator-controlled elements should, however, have no influence on the subsequently described method of the invention. Rather, an actuation of a particular vehicle brake operator-controlled element leads to a direct activation of a brake system 10 of the vehicle in a manner known per se. The actuation of the particular vehicle brake operator-controlled element thereby leads directly to a braking of the vehicle in the context of a safety function which makes possible also a full braking or emergency braking, for example, with the aid of an anti-blocking system.

An actuation of the particular vehicle brake operator-controlled element leads also to a deactivation of the vehicle speed control 20.

The input unit 15 is, on the one hand, connected to the engine control 1 and, on the other hand, to the monitoring unit 35 so that the user inputs at the input unit 15 are supplied to the engine control 1 as well as the monitoring unit 35. The monitoring unit 35 includes a vehicle speed control monitoring unit 50 and a speed limiting function monitoring unit 55. Inputs undertaken by the driver at the input unit 15 are, on the one hand, supplied to the vehicle speed control unit 20, the speed limiting function 25 and the hill holder function 30 and, on the other hand, to the vehicle speed control monitoring unit 50 and the speed limiting function monitoring unit 55. This is not shown in FIG. 1 for reasons of clarity. Accordingly, a desired speed, which is pregiven at the input unit 15, and data as to the degree of actuation of the vehicle brake operator-controlled elements are supplied to the vehicle speed control unit 20 as well as to the vehicle speed control monitoring unit 50. Furthermore, an upper speed limit, which is pregiven at the input unit 15, is supplied to the speed limiting function 25 as well as also to the speed limiting function monitoring unit 55. The brake pressure, which is developed with the actuation of the particular vehicle brake operator-controlled element as well as an engine torque, which is wanted by the driver via the actuation of the accelerator pedal, are supplied to the hill holder function 30.

The vehicle speed control unit 20 can be connected via a first switch 85 to a torque coordinator 65 of the engine control 1. The speed limiting function 25 can be connected via a second switch 90 to the torque coordinator 65. The hill holder function 30 is connected directly to the torque coordinator 65. In dependence upon the input quantities received by the input unit 15, the vehicle speed control unit 20, the speed limiting function 25 and the hill holder function 30 each form a desired torque which is to be realized and which is supplied to the torque coordinator 65 for determining a resulting additional desired torque which is to be realized. The desired torque is outputted by the vehicle speed control unit 20 and causes the actual speed to approach the desired speed. The desired torque, which is outputted by the speed limiting function 25, limits the actual speed of the vehicle to the pregiven upper speed limit. The desired torque, which is outputted by the hill holder function 30, results from the driver command determined by the actuation of the accelerator pedal. The hill holder function 30 further supplies the brake pressure, which is determined by the actuation of one of the vehicle brake operator-controlled elements, to the torque coordinator 65. The torque coordinator 65 is, on the one hand, connected to a drive train control 70 and, on the other hand, to a deceleration function 75 which are likewise parts of the engine control 1. The drive train control 70 functions to realize the resulting torque, which results from the inputs of the vehicle speed control 20 and the speed limiting function 25, by adjusting corresponding parameters of the drive unit of the vehicle. The drive unit can, for example, be an internal combustion engine or an electric motor or be a motor based on an alternative drive concept. In the case of the use of an internal combustion engine, the engine can, for example, be a spark-ignition engine or a diesel engine. The realization of the resulting desired torque takes place with the spark-ignition engine, for example, via a suitable adjustment of the ignition time point and/or of the air supply and, in the diesel engine, by a suitable adjustment of the injection time point and/or the injection quantity.

For the case that the actual speed is greater than the desired speed (which is pregiven at the input unit 15 or, in the case of an adaptive vehicle speed control, pregiven in dependence upon the traffic traveling ahead) or the upper speed limit, then the vehicle speed control or the speed limiting can be realized additionally or alternatively to the drive train control also with the aid of the deceleration function 75. Furthermore, the hill holder function 30 can also be realized with the deceleration function 75 in that the desired brake action on a hill is achieved after releasing the corresponding vehicle brake operator-controlled element by storage of the brake pressure which was sufficient to bring the vehicle to standstill on the hill. Only when the engine torque, which is wanted by the driver via the actuation of the accelerator pedal, is sufficient in order to accelerate the vehicle reliably on the hillside, can the deceleration function 75 again reduce the stored brake pressure in order to make possible a reliable start drive on the hill. In this way, a vehicle deceleration is pregiven by the deceleration function 75 for the vehicle speed control 20 as well as for the speed limiting function 25 and the hill holder function 30. This vehicle deceleration is independent of the actuation of a vehicle brake operator-controlled element. In the case of the hill holder function 30, the deceleration function 75 causes a braking of the vehicle without one of the vehicle braking operator-controlled elements being actuated. In the case of the vehicle speed control 20 and the speed limiting function 25, a desired speed or an upper speed limit is pregiven, for example, at the vehicle-speed control lever, which is less than the instantaneous actual speed so that the deceleration function 75 can initiate a braking operation in order to cause the actual speed to approach the desired speed or the upper speed limit without actuation of the vehicle brake operator-controlled elements. The output of the deceleration function with the brake action to be adjusted or the brake pressure to be adjusted is connected via an AND-gate 95 to a deceleration interface 5. The deceleration interface 5 is connected to a brake system 10 via a bus system 100 (for example, a CAN-bus), which connects the control apparatuses, so that the braking action, which is requested by the deceleration function 75, can be transmitted via the deceleration interface 5 and the bus system 100 connecting the control apparatuses to the brake system 10 of the vehicle for realization. The brake system 10 includes, for example, a brake control apparatus or a control apparatus for an electronic stability program and addresses the vehicle brakes individually or together directly in dependence upon the wanted braking action transmitted from the deceleration interface 5. It is understood that the brake system responds also to direct actuation of a vehicle brake operator-controlled element which, however, is not the subject matter of this invention.

The vehicle speed control monitoring unit 50 monitors the vehicle speed control unit 20 in a manner known per se. If the vehicle speed control monitoring unit 50 detects a malfunction of the vehicle speed control unit 20, then the monitoring unit 50 controls the first switch 85 in such a manner that the connection between the vehicle speed control unit 20 and the torque coordinator 65 is interrupted. The vehicle speed control is deactivated in this manner. The monitoring of the speed limiting function 25 by the speed limiting function monitoring unit 55 takes place in the same manner. With the detection of a malfunction of the speed limiting function 25, the monitoring unit 55 drives the second switch 90 in such a manner that the speed limiting function 25 is separated from the torque coordinator 65 and therefore the speed limiting function 25 is deactivated. A monitoring of the hill holder function 30 is not provided in the embodiment described. In addition to a monitoring of the drive train control 70, which takes place in a manner known per se and is not shown in FIG. 1, a monitoring of the deceleration function 75 takes place according to FIG. 1 in the monitoring unit 35. For this purpose, the monitoring unit 35 includes monitoring means 40, which are realized by a corresponding hardware component and/or software component in the monitoring unit 35.

The monitoring means 40 are connected to the vehicle speed control monitoring unit 50 and the speed limiting function monitoring unit 55 and receive the input quantities of the input unit 15 from the monitoring units 50 and 55, that is, in this example, the corresponding vehicle-speed control lever actuations or operator-controlled lever actuations for adjusting a wanted desired speed or upper speed limit. Furthermore, an actual speed detection unit 60 is provided which detects the actual speed of the vehicle and supplies the same to the monitoring means 40. Furthermore, the resulting desired torque, which is outputted by the torque coordinator 65 to the drive train control 70, is supplied to the monitoring means 40. It is also noted that additional desired torques can be supplied to the torque coordinator 65 other than the described desired torques for coordination and formation of the resulting desired torque, for example, the following can, for example, be supplied to the torque coordinator 65: a desired torque request from an idle control, from a surge damping control, from comfort functions such as a climate control system, et cetera. These are not shown in FIG. 1 for the sake of clarity.

Based on the incoming data, the monitoring means 40 checks whether a brake intervention, which is initiated by the deceleration function 75, is permissible. Corresponding to this check, activation/deactivation means 45 are driven which can enable or block the deceleration function 75 and are supplied as second input quantity to the AND-gate 95. Here, the activation/deactivation means 45 can be formed as a component which, in the case of a brake intervention, which is initiated by the deceleration function 75 and is recognized as permissible by the monitoring means 40, sets a deactivation bit at its output to one and supplies the same to the AND-gate 95 so that the braking action, which is requested by the deceleration function 75, can be transmitted to the deceleration interface 5 and from there to the brake system via the bus system 100 connecting the control apparatuses. If the monitoring means 40 determine that a brake intervention, which is initiated by the deceleration function 75, is not permissible, then the deactivation bit in the component 45 is set to zero and therefore the output of the AND-gate 95 is also set to zero so that the brake intervention, which is wanted by the deceleration function 75, cannot be transmitted to the deceleration interface 5 and therefore also not to the brake system 10.

A fault reaction monitoring unit 80 is provided in the monitoring unit 35 (which unit 80 can be arranged alternatively also independently of the monitoring unit 35 in its own computer) and defines a third level in the control and monitoring unit 110. The fault reaction monitoring unit 80 checks the operation of the monitoring means 40. For this purpose, on the one hand, the output of the activation/deactivation means 45 and therewith the deactivation bit is supplied to the fault reaction monitoring unit 80. On the other hand, the monitoring unit 35 includes a further bus interface 105 which connects the fault reaction monitoring unit 80 to the bus system 100 which connects the control apparatuses. In this way, the output of the deceleration interface 5 can be transmitted via the additional bus interface 105 to the fault reaction monitoring unit 80. For the case that the deactivation bit is zero and nonetheless an output signal other than zero is received from the deceleration interface 5 via the additional bus interface 105 in the fault reaction monitoring unit 80, then the fault reaction monitoring unit 80 causes a switchoff of the deceleration interface in accordance with the broken arrow in FIG. 1 in order to prevent a further output of defective brake requests to the brake system 10 via the bus system 100 connecting the control apparatuses.

In the following, it is described how the monitoring means 40 executes the check as to the permissibility of a brake intervention initiated by the deceleration function 75. A brake intervention by the deceleration function 75 is generally viewed as permissible and the deactivation bit in the component 45 set to zero when the actual speed is less than a pregiven value which, for example, lies at 10 km/h. A brake intervention, which is initiated by the deceleration function 75, is therefore recognized as permissible when the instantaneous vehicle speed or the actual speed drops below the pregiven value. On the one hand, an erroneously initiated braking by the deceleration function 75 for actual speeds below the pregiven value is uncritical and essentially free of wear and, on the other hand, it is ensured in this way that the hill holder function 30 after braking the vehicle on a hill can actively access the brake system 10 with the aid of the deceleration function 75 independently of the actuation of a vehicle braking operator-controlled element. The pregiven value for the vehicle speed should be selected as low as possible in order to essentially prevent the wear of the vehicle brake for a defectively initiated brake intervention. As a rule, this is the case for the selection of 10 km/h for the pregiven value.

Additionally, or alternatively, the input data from the input unit 15, which is received via the vehicle speed control monitoring unit 50 or the speed limiting function monitoring unit 55 in the monitoring means 40, can be evaluated as a criterion for the permissibility of a brake intervention initiated by the deceleration function 75. If, in the case of the vehicle speed control, a desired speed is inputted at the input unit 15 or, in the case of the adaptive vehicle speed control, a desired speed is inputted in dependence upon traffic moving ahead, which is less than the instantaneous actual speed, then the approaching of the actual speed to the desired speed via a brake intervention is plausible and a brake intervention, which is initiated correspondingly by the deceleration function 75, is permissible. If, in contrast, the actual speed is less than the desired speed inputted at the input unit 15 or, in the case of the adaptive vehicle speed control, inputted in dependence upon the traffic moving ahead, then a brake intervention to cause the actual speed to approach the desired speed is not plausible and a brake intervention, which is initiated by the deceleration function 75, is therefore not permissible. The same applies for the case of the speed limiting function 25. If the upper speed limit, which is pregiven at the input unit 15, is less than the instantaneous actual speed, then a brake intervention to limit the actual speed to the upper speed limit is purposeful and plausible and a corresponding brake intervention, which is initiated by the deceleration interface 75, is permissible. If, in contrast, the actual speed is less than the upper speed limit, which is pregiven at the input unit 15, then a limiting of the actual speed is not required and a brake intervention not necessary and therefore not plausible so that a brake intervention, which is initiated by the deceleration function 75, is not permissible.

Generally, the permissibility of a brake intervention, which is initiated by the deceleration function 75, can be checked by the monitoring means 40 as to whether such a brake intervention is plausible with the inputs made at the input unit 15.

Only such inputs at the input unit 15 are viewed in this example which can be pregiven as a driver command at least one operator-controlled element of the vehicle different from a vehicle brake operator-controlled element.

An operator-controlled element of this kind is shown in phantom outline in FIG. 1 as representative with the reference numeral 115 and is shown as part of the input unit 15.

The actuation of a vehicle brake operator-controlled element (for example, a brake pedal in active vehicle speed control) leads nonetheless to a deactivation of the vehicle speed control in a manner known per se.

Additionally, or alternatively, the permissibility of a brake intervention, which is initiated by the deceleration function 75, can be checked by a monitoring means 40 in that the resulting desired torque, which is outputted by the torque coordinator 65 to the drive train control 70, is compared to a pregiven threshold torque. If the resulting desired torque lies below the threshold torque, then this desired torque is recognized as an engine drag torque. For this purpose, the threshold torque must be suitably selected and, as a rule, is approximately zero. When the resulting desired torque is an engine drag torque, then a deceleration command is recognized. A support of such a deceleration command by a brake intervention, which is initiated by the deceleration function 75, is therefore plausible and is recognized as permissible. If, in contrast, the resulting desired torque lies above the threshold torque, then the desired torque is not recognized as an engine drag torque. In this case, no deceleration command is present and a brake intervention would not be plausible so that an intervention, which is initiated by the deceleration function 75, is recognized as being impermissible.

In addition, or alternatively, it can be provided that the monitoring means 40 checks the permissibility of a brake intervention, which is initiated by the deceleration function 75, in that the monitoring means 40 compares the input of the vehicle deceleration, which is requested by the torque coordinator 65, to a pregiven range. This vehicle deceleration is supplied to the deceleration function 75 as well as the monitoring means 40. If the input of the vehicle deceleration lies within the pregiven range, then a corresponding brake intervention, which is initiated by the deceleration function, is recognized as permissible. If the input of the vehicle deceleration lies outside of the pregiven range, then a brake intervention, which is initiated by the deceleration function 75, is recognized as impermissible. The pregiven range can, for example, be selected from zero to 2.5 $m/s^2$ for the magnitude of the vehicle deceleration. A vehicle deceleration in this range results, as a consequence, in a comfortable braking operation of the vehicle for the driver. A full braking or emergency braking in the context of a safety function is not possible with a vehicle deceleration in such a pregiven range. Also, no full braking or emergency braking in the context of a safety function is to be realized via the deceleration function 75. This is reserved to an actuation of a vehicle brake operator-controlled element by the driver which is, for example, supported by an anti-blocking system.

If, for one of the used permissibility checks in the monitoring means 40, the result occurs that a brake intervention, which is initiated by the deceleration function 75, is impermissible, then the deactivation bit is set to zero and the deceleration function 75 is thereby deactivated. A setting of the deactivation bit to one and therefore an enabling of a brake intervention, which is initiated by the deceleration function 75, takes place only when all executed permissibility checks in the monitoring means 40 come to the result that the brake intervention, which is initiated by the deceleration function 75, is permissible.

Only for the case wherein a brake intervention, which is initiated by the deceleration function 75, is recognized as permissible when the instantaneous vehicle speeds drop below the pregiven value, is a check of further criteria for the permissibility of a brake intervention, which is initiated by the deceleration function 75, not necessary because even a defective initiated brake intervention does not lead to a significant wear of the vehicle brakes and furthermore, the realizability of the hill holder function 30 is ensured.

If a brake intervention, which is initiated by the deceleration function 75, is deactivated because of its impermissibility, then the function of the vehicle speed control or the speed limiting function 25 is not thereby deactivated. In such a case, a deceleration of the actual speed can then not be realized by the brake system but only via the drive train by means of the drive train control 70 in a manner known per se.

A switchoff of the deceleration interface 5 by the fault reaction monitoring unit 80 also leads only to the situation that a defective deceleration command to the brake system 10, which is transmitted via the bus system 100 connecting the control apparatuses, is rescinded without it being necessary to disable other bus interfaces (not shown in FIG. 1) for the communication of the engine control 1 with other control apparatuses of the motor vehicle via the bus system 100 connecting the control apparatuses.

Notwithstanding the described fault reaction of the deactivation of the deceleration function 75 by the monitoring means 40 or the deactivation of the deceleration interface 5 by the fault reaction monitoring unit 80, the vehicle speed control unit 20 can be deactivated via the first switch 85 or the speed limiting function 25 can be deactivated via the second switch 90 in the case of a fault. This is the case, for example, when the vehicle speed control monitoring unit 50 or the speed limiting function monitoring unit 55 receive implausible data from the input unit 15. This can, in the case of the vehicle speed control, take place, for example, in that simultaneously a command is received for increasing the desired speed and for decreasing the desired speed. It can also happen in that a desired speed, which lies outside of the pregiven range and is therefore defective data, is received by the input unit 15. Correspondingly, in the case of the speed limiting function 25, an upper speed limit can be received from the input unit 15 in the case of a fault which upper speed limit lies outside a pregiven range and therefore leads to a deactivation of the speed limiting function 25 via the second switch 90. The corresponding monitoring of the vehicle speed control unit 20 takes place via the vehicle speed control monitoring unit 50 and the monitoring of the speed limiting function 25 takes place via the speed limiting control function monitoring unit 55 in the manner described.

Furthermore, the possibility is present for a fault in the engine control 1, which is not limited to the vehicle speed control, the speed limiting function 25, the hill holder function 30, the deceleration function 75 or the drive train control 70, to completely reset the engine control 1 and after a short time to start the same anew in order to eliminate an occurring software fault or hardware fault. As an example for a hardware fault, a so-called "bitkipper" via EMV effect (electromagnetic compatibility) is mentioned wherein one or several bits in a RAM or ROM of the engine control apparatus 1 are made incorrect. This can lead to any possible fault function, for example, even to a defective driving of the deceleration function 75 or of the deceleration interface 5. If only the deceleration function 75 or the deceleration interface 5 is affected, then the above-described deactivation of the deceleration function 75 or the deceleration interface 5 occurs. If the error is, however, in a higher level function, for example, in the torque coordinator 65, then the described fault measures of reset and restart of the engine control 1 are recommended.

If the new start of the engine control 1 also does not lead to an elimination of the fault, then it can be further provided to switch off all interfaces of the engine control 1 to the bus system 100 connecting the control apparatuses in order to prevent that defective data is transmitted to other control apparatuses. The engine control 1 can remain activated in order to at least maintain the function of the drive train.

The engine control 1 itself is deactivated for reasons of safety when the fault, which cannot be eliminated by resetting and a new start of the engine control 1, would have effects on the driving behavior of the vehicle which could effect the driving safety and, for example, lead to an unwanted acceleration. In this case, the engine control 1 is also deactivated and the driving operation is interrupted until the fault is eliminated. In all described fault functions, the fault reaction can be only temporary for the duration of the implausibility and therefore be reversible or can be for the entire driving cycle and therefore be irreversible. For a reversible fault reaction, the availability is increased because the deactivated component system (for example, the vehicle speed control or the deceleration function 75) can again be utilized after the end of the implausibility and no new engine start is needed.

The monitoring of the deceleration function 75 or the deceleration interface 5 by the monitoring means 40 or the fault reaction monitoring unit 80 makes it possible to be able to initiate an active brake intervention independently of an actuation of a vehicle brake operator-controlled element in any desired control apparatus or in any desired control unit of the vehicle and therefore to increase the functionality of the corresponding control apparatus. With reference to the example, it was described how such an additional initiable brake intervention makes possible additional functions in the engine control 1 such as a vehicle speed control with brake intervention, a variable speed limiting with brake intervention or a hill holder function 30 with brake intervention. With the deceleration function 75 and the deceleration interface 5 as well as the monitoring thereof by the monitoring means 40 and, if present as shown in FIG. 1, the fault reaction monitoring unit 80, a defectively motivated drive of the deceleration interface 5 or a defective activation of the deceleration function 75 can be prevented. The monitoring concept of the engine control 1 is thus, with respect to its functionality, expanded by the monitoring unit 40 and, if needed, the fault reaction monitoring unit 80 to the check of an unwanted deceleration.

With the functional independence of the monitoring of the deceleration function 75 and of the deceleration interface 5, the monitoring concept for the monitoring of unwanted deceleration can be integrated modularly and without effect on other functions and monitoring of the engine control 1 in the monitoring unit 35. Here, it is decisive that, at first, only the deceleration function 75 is deactivated when a brake intervention of the brake system 10, which is initiated by the deceleration function 75, is recognized as impermissible by the monitoring means 40. With the deactivation of the deceleration function 75, it is prevented that the deceleration interface 5 transmits a deceleration command to the braking system 10 via the bus system 100 connecting the control apparatuses. Farther reaching fault reactions are therefore at first not required. In the case of such a disablement of the deceleration function 75, the remaining functions of the engine control 1 and their other interfaces to the bus system 100, which connects the control apparatuses, remain untouched. The monitoring means 40 and the possibly present fault reaction monitoring unit 80 in this way make possible the reliable prevention of an implausible response from the deceleration interface 5 via the deceleration function 75 for the case that functions use the deceleration interface 5 via the deceleration function 75. These functions are, for example, the vehicle speed control, the speed limiting function 25 and/or the hill holder function 30, for example, in the engine control 1. In this way, a monitoring concept for the deceleration function 75 and the deceleration interface 5 is realized.

The described monitoring concept can be transferred to any function in any desired control apparatus or in any desired control unit which can initiate an active braking intervention via a deceleration function 75 and a deceleration interface 5. In FIG. 1, only the vehicle speed control, the speed limiting function 25 and the hill holder function 30 are, for example, shown which can be mounted or arranged in any desired combination or also individually in the engine control 1. The monitoring of the braking intervention, which is initiated by the deceleration function 75, via the monitoring means 40 was described based on four criteria listed by way of example for the used functions of the vehicle speed control and the speed limiting function 25 as well as the hill holder function 30. If additional functions are provided in the engine control 1, which act on the deceleration function 75 to initiate braking operations independently of the actuation of a vehicle brake operator-controlled element, then the monitoring of the deceleration function 75 via the monitoring means 40 can be designed with more complexity and can include additional criteria for checking the permissibility of such a brake intervention.

As a deceleration interface 5, any type of interface can be used which can initiate an active braking intervention via the bus system 100 connecting the control apparatuses.

The monitoring means 40 and the possibly present fault reaction monitoring unit 80 for monitoring for unwanted brake intervention can contain the already established mechanisms of the modular program sequence control and of the modular command test. These mechanisms of the modular program sequence control and of the modular command test run in a memory region, which is separate from the engine control 1, for example, in a RAM and/or a ROM and are cyclically monitored during operation. The mechanisms are not shown in FIG. 1. In the case of a fault recognized by these mechanisms, a switchoff of the engine control 1 via a switchoff path takes place via a monitoring module of the engine control 1 not shown in FIG. 1.

In FIG. 2, a sequence plan for an exemplary sequence of the method of the invention is shown in the monitoring means 40 for checking the permissibility of a brake intervention initiated by the deceleration function 75. After the start of the program, a check is made at program point 200 by the monitoring means 40 as to whether the actual speed of the vehicle is less than the pregiven value. If this is the case, then the program branches to program point 220; otherwise, the program branches to program point 205. At program point 205, the monitoring means 40 checks whether the input of the user, which is received by the input unit 15, or the inputs of the user, which are received by the input unit 15, for initiating a brake intervention via the deceleration function 75 is or are plausible. If this is the case, then the program branches to program point 210; otherwise, the program branches to program point 225. Such a plausibility is present, as described, for example, when, in the case of the vehicle speed control, the actual speed is greater than the desired speed pregiven at the input unit 15. At program point 210, the monitoring means 40 checks whether an engine drag torque is requested by the torque coordinator. If this is the case, then the program branches to program point 215; otherwise, the program branches to point 225.

At program point 215, the monitoring means 40 checks whether the input of the vehicle deceleration, which is requested by the torque coordinator 65, lies within the pregiven range. If this is the case, then the program branches to program point 220; otherwise, the program branches to program point 225.

At program point 220, the monitoring means 40 detects a braking intervention, which is initiated by the deceleration function, as permissible and causes the component 45 to set the deactivation bit to one. Thereafter, there is a movement out of the program.

At program point 225, the monitoring means 40 detects a brake intervention, which is initiated by the deceleration function 75, as impermissible and causes the component 45 to set the deactivation bit to zero. Thereafter, there is a movement out of the program.

It is understood that the foregoing description is that of the preferred embodiments of the invention and that various changes and modifications may be made thereto without departing from the spirit and scope of the invention as defined in the appended claims.

What is claimed is:

1. A method of monitoring a deceleration function of a control unit of a motor vehicle for inputting a vehicle deceleration independently of the actuation of a vehicle brake operator-controlled element, the method comprising the steps of:

transmitting the input vehicle declaration via a deceleration interface to a brake system of said motor vehicle to realize said input vehicle deceleration;

checking whether a brake intervention of said brake system, which is initiated by said deceleration function, is permissible; and, deactivating only said deceleration function when said brake intervention is impermissible.

2. The method of claim 1, comprising the further step of recognizing said brake intervention as permissible when said brake intervention is plausible to a driver command pregiven at at least an operator-controlled element of said motor vehicle different from a vehicle brake operator-controlled element.

3. The method of claim 1, comprising the further step of recognizing said brake intervention as permissible when a motor drag torque is requested.

4. The method of claim 1, comprising the further step of recognizing said brake intervention as permissible when the input of the vehicle deceleration lies within a pregiven range.

5. The method of claim 1, comprising the further step of recognizing said brake intervention as permissible when an instantaneous vehicle speed drops below a pregiven value.

6. The method of claim 1, wherein a drive unit of said motor vehicle is controlled via said control unit.

7. The method of claim 6, wherein said control unit is a motor control.

8. The method of claim 1, wherein at least one of the following is realized by said control unit: a vehicle speed control, a speed limiting function and a hill holder function.

9. The method of claim 8, wherein said speed limiting function is a variable speed limiting function.

10. An arrangement for monitoring a deceleration function of a control unit of a motor vehicle for inputting a vehicle deceleration independently of the actuation of a vehicle brake operator-controlled element, the arrangement comprising:

a deceleration interface for transmitting the input vehicle deceleration to a brake system of said motor vehicle to realize said input vehicle deceleration;

monitoring means for checking whether a brake intervention, which is initiated by said deceleration function, is permissible; and, deactivating means for deactivating only said deceleration function when said brake intervention is impermissible.

* * * * *

CERTIFICATE OF CORRECTION

PATENT NO. : 7,124,009 B2

APPLICATION NO. : 10/685804
DATED : October 17, 2006
INVENTOR(S) : Mario Kustosch, Gerit von Schwertfuehrer and Michael Glora It is certified that error appears in the above-identified patent and that said Letters Patent is hereby corrected as shown below:

In column 12:
Line 34: delete "declaration" and insert -- deceleration -- therefor.

Signed and Sealed this

Sixteenth Day of January, 2007

JON W. DUDAS
*Director of the United States Patent and Trademark Office*